(12) United States Patent
Kim et al.

(10) Patent No.: US 9,025,920 B2
(45) Date of Patent: May 5, 2015

(54) OPTICAL COUPLING DEVICES AND SILICON PHOTONICS CHIPS HAVING THE SAME

(75) Inventors: Do Won Kim, Daejeon (KR); Gyungock Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 13/620,560

(22) Filed: Sep. 14, 2012

(65) Prior Publication Data

US 2013/0156370 A1    Jun. 20, 2013

(30) Foreign Application Priority Data

Dec. 16, 2011  (KR) .................. 10-2011-0136717

(51) Int. Cl.
*G02B 6/26* (2006.01)
*G02B 6/42* (2006.01)
*G02B 6/30* (2006.01)
*G02B 6/122* (2006.01)

(52) U.S. Cl.
CPC .............. *G02B 6/305* (2013.01); *G02B 6/1228* (2013.01)

(58) Field of Classification Search
CPC .... G02B 6/305; G02B 6/0046; G02B 6/0048; G02B 6/1228
See application file for complete search history.

(56) References Cited

U.S. PATENT DOCUMENTS

| 7,551,826 B2 | 6/2009 | Taylor |
| 7,643,710 B1 | 1/2010 | Liu |
| 2004/0037497 A1* | 2/2004 | Lee ................................ 385/28 |

FOREIGN PATENT DOCUMENTS

| KR | 10-2005-0112380 A | 11/2005 |
| KR | 10-2009-0029548 A | 3/2009 |

OTHER PUBLICATIONS

Minhao Pu et al., "Ultra-low-loss inverted taper coupler for silicon-on-insulator ridge waveguide", Optics Communications, No. 283, 2012, pp. 3678-3682, Elsevier.

Yan Liu et al., "Fabrication and optical optimization of spot-size converters with strong cladding layers", Journal of Optics A: Pure and Applied Optics, 2009, No. 11, pp. 1-5, IOP Publishing.

* cited by examiner

*Primary Examiner* — Uyen Chau N Le
*Assistant Examiner* — Chad Smith

(57) ABSTRACT

Provided are optical coupling devices and silicon photonics chips having the same. the optical coupling device may include a lower layer having a first region and a second region, a first core layer disposed on the lower layer, the first core layer including first and second waveguides disposed on the first and second regions, respectively, a clad layer covering the first waveguide, and a second core layer interposed between the clad layer and the lower layer to cover the second waveguide. The second waveguide has a width decreasing with increasing distance from the first region and a vertical thickness greater than that of the first waveguide.

19 Claims, 13 Drawing Sheets

OPTICAL COUPLING DEVICES AND SILICON PHOTONICS CHIPS HAVING THE SAME

CROSS-REFERENCE TO RELATED APPLICATIONS

This U.S. non-provisional patent application claims priority under 35 U.S.C. §119 to Korean Patent Application No. 10-2011-0136717, filed on Dec. 16, 2011, in the Korean Intellectual Property Office, the entire contents of which are hereby incorporated by reference.

BACKGROUND OF THE INVENTION

Embodiments of the inventive concepts relate to a silicon photonics technology, and in particular, to an optical coupling technology.

A grating coupler and a mode size converter are widely used to realize an optical coupling with a silicon photonics integrated circuit. Especially, the use of the mode size converter can provide technical advantages, such as higher optical coupling efficiency (e.g., less than 1 dB) and wavelength-independent optical coupling and decoupling.

However, for the optical coupling technologies, an edge coupling is needed to use the mode size converter. For example, there has been a technical difficulty in realizing a vertical coupling in wafer level. In addition, it is necessary to perform an additional process of polishing a facet of a final silicon photonics chip.

SUMMARY

Embodiments of the inventive concepts provide optical coupling devices configured to provide high optical coupling efficiency.

Other embodiments of the inventive concepts provide optical coupling devices configured to realize a vertical coupling.

Still other embodiments of the inventive concepts provide a silicon photonics chip including an optical coupling device, which is configured to provide high optical coupling efficiency and realize a vertical coupling.

According to example embodiments of the inventive concepts, an optical coupling device may include a lower layer having a first region and a second region, a first core layer disposed on the lower layer, the first core layer including first and second waveguides disposed on the first and second regions, respectively, a clad layer covering the first waveguide, and a second core layer interposed between the clad layer and the lower layer to cover the second waveguide. The second waveguide has a width decreasing with increasing distance from the first region and a vertical thickness greater than that of the first waveguide.

In example embodiments, the first core layer may further include a slab portion provided at both sides of the first waveguide to cover the first region of the lower layer.

In example embodiments, a difference in height between top surfaces of the first waveguide and the slab portion may be smaller than the vertical thickness of the second waveguide.

In example embodiments, the slab portion may be formed to expose the second region of the lower layer.

In example embodiments, the second waveguide may be formed to have a tapered structure, thereby including a tip spaced apart from the first waveguide, and the tip of the second waveguide may be covered with the second core layer.

In example embodiments, the second core layer may include an outer surface facing an external optical fiber provided at the outside thereof, and the outer surface of the second core layer may have an area corresponding to that of a core of the external optical fiber.

In example embodiments, a horizontal width of the second core layer may be substantially uniform, when measured along a direction of a longitudinal axis of the second waveguide direction. In other embodiments, a horizontal width of the second core layer may decrease with decreasing distance from the first waveguide, when measured along a direction of a longitudinal axis of the second waveguide direction.

In example embodiments, the second waveguide may include a tip spaced apart from the outer surface of the second core layer and the first waveguide.

In example embodiments, the first core layer may be formed of silicon, the second core layer may be formed of a material having a refractive index smaller than that of the first core layer, and the clad layer may be formed of a material having a refractive index smaller than that of the second core layer.

According to example embodiments of the inventive concepts, an optical coupling device may include a first core layer including first and second waveguides, a clad layer covering the first waveguide, and a second core layer covering the second waveguide. The second waveguide may have a width decreasing with increasing distance from the first waveguide and a vertical thickness greater than that of the first waveguide, and the second core layer may include a reflecting surface slantingly provided on a longitudinal axis of the second waveguide.

In example embodiments, the reflecting surface of the second core layer may have a slanting angle selected to change a propagation direction of an incident light from a direction parallel to the second waveguide to a direction substantially perpendicular to a top surface of the clad layer.

In example embodiments, the device may further include a reflecting element formed of a material having a high reflectance to cover the reflecting surface.

In example embodiments, the second core layer may be formed to define a slit, the slit may be formed to be inclined to a top surface of the second core layer, and one surface of the slit serves as the reflecting surface.

In example embodiments, the device may further include a lower layer provided below the first and second core layers. The second core layer may include first and second portions attached to the lower layer at both sides of the slit, respectively, and a relative disposition between the first and second portions may be fixed by the lower layer.

According to example embodiments of the inventive concepts, a silicon photonics chip may include at least one optical device, a first waveguide connected to the optical device, a second waveguide extending from the first waveguide, a clad layer provided on the first and second waveguides, and a third waveguide interposed between the clad layer and the second waveguide to cover the second waveguide, the clad layer may be formed of a material having a refractive index smaller than that of the first and second waveguides, and the third waveguide may be formed of a material having a refractive index smaller than that of the second waveguide and greater than that of the clad layer, the second waveguide has a width decreasing with increasing distance from the first waveguide and a vertical thickness greater than that of the first waveguide.

In example embodiments, the silicon photonics chip may further include a slab waveguide covering partially both sidewalls of the first waveguide. A difference in height between top surfaces of the first and slab waveguides may be smaller than the vertical thickness of the second waveguide.

In example embodiments, the third waveguide may include a reflecting surface provided on a longitudinal axis of the second waveguide, and the reflecting surface may be formed to be inclined to the longitudinal axis of the second waveguide.

In example embodiments, the silicon photonics chip may further include a reflecting element formed of a material having high reflectance to cover the reflecting surface.

BRIEF DESCRIPTION OF THE DRAWINGS

Example embodiments will be more clearly understood from the following brief description taken in conjunction with the accompanying drawings.

FIG. 1 is a plan view exemplarily illustrating an optical coupling device according to example embodiments of the inventive concept.

FIG. 2 is a perspective view exemplarily illustrating an optical coupling device according to example embodiments of the inventive concept.

FIG. 3 is a sectional view taken along a dotted line I-I' of FIG. 1.

FIG. 4 is a sectional view taken along a dotted line II-II' of FIG. 1.

FIGS. 5 through 8 are diagrams showing a result of finite-difference time-domain (FDTD) analysis performed on the optical coupling device shown in FIGS. 1 through 4.

FIG. 9 is a diagram showing a result of FDTD analysis performed on an optical coupling device according to a comparative embodiment.

FIG. 10 is a plan view exemplarily illustrating an optical coupling device according to other example embodiments of the inventive concept.

FIG. 11 is a sectional view taken along a dotted line I-I' of FIG. 10.

FIG. 12 is a sectional view taken along a dotted line II-II' of FIG. 10.

FIGS. 13 and 14 are sectional views exemplarily illustrating optical coupling devices according to still other example embodiments of the inventive concept.

FIGS. 15 and 16 are diagrams showing a result of FDTD analysis performed on the optical coupling device of FIG. 13 or FIG. 14.

FIGS. 17 and 18 are sectional views exemplarily illustrating optical coupling devices according to even other example embodiments of the inventive concept.

Figure 1:
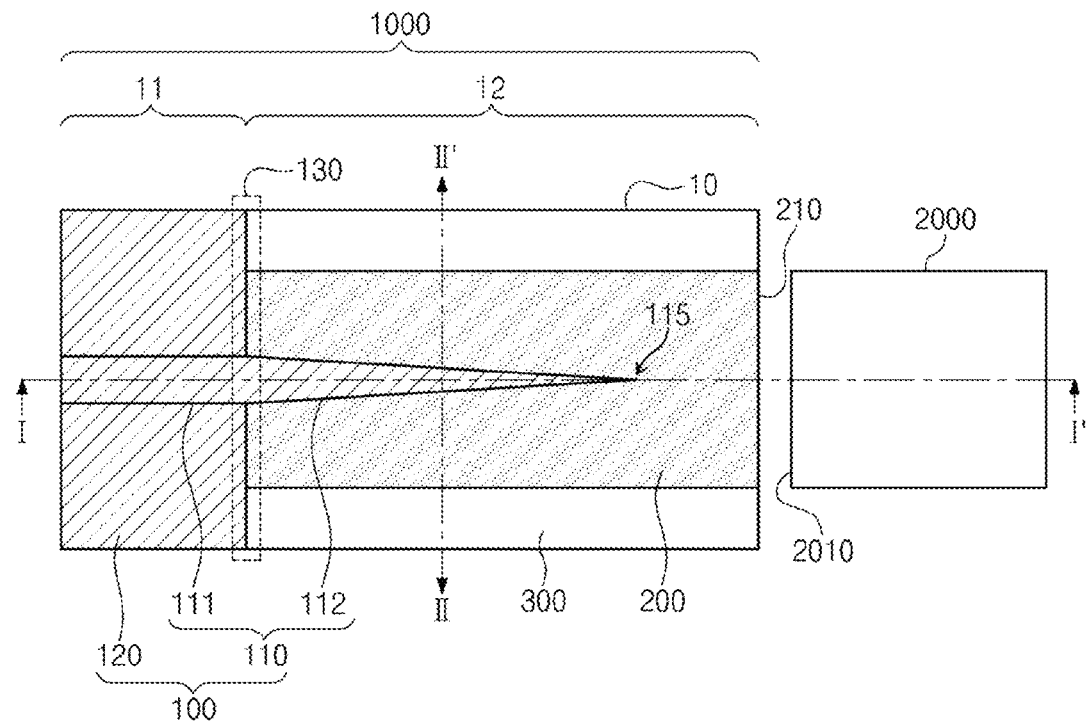
FIGS. 1 through 18 represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
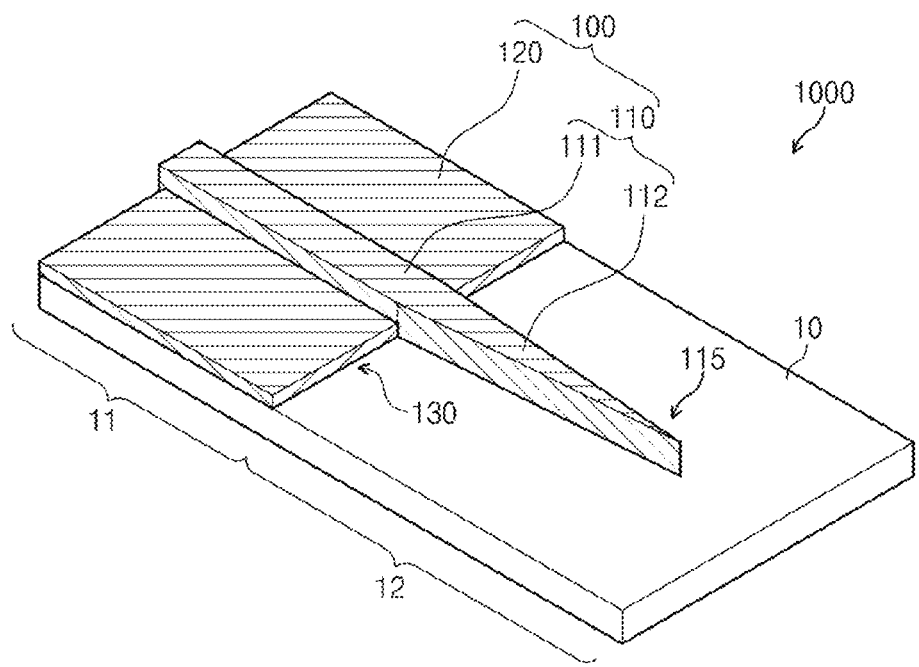
Figure 3:
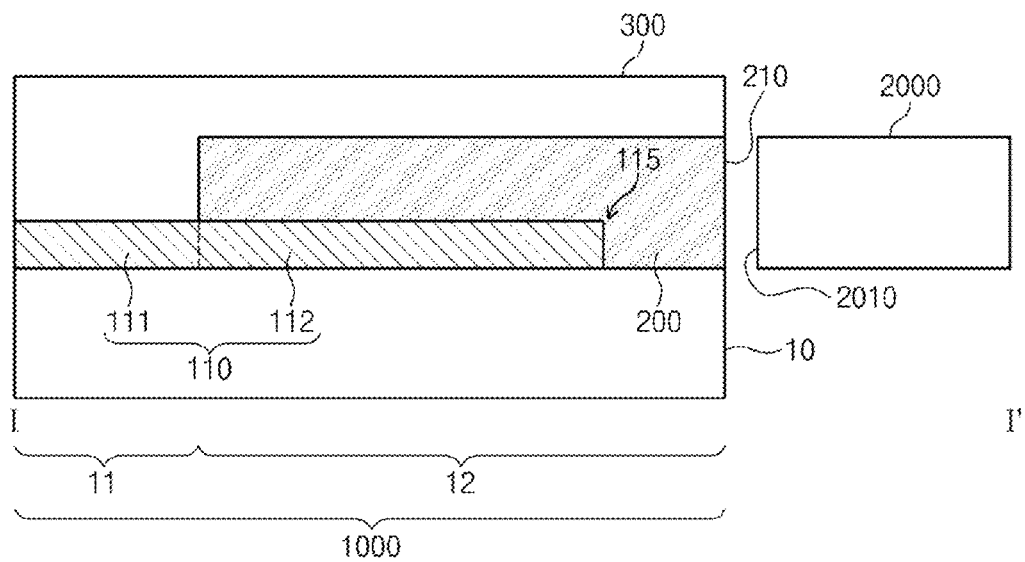
Figure 4:
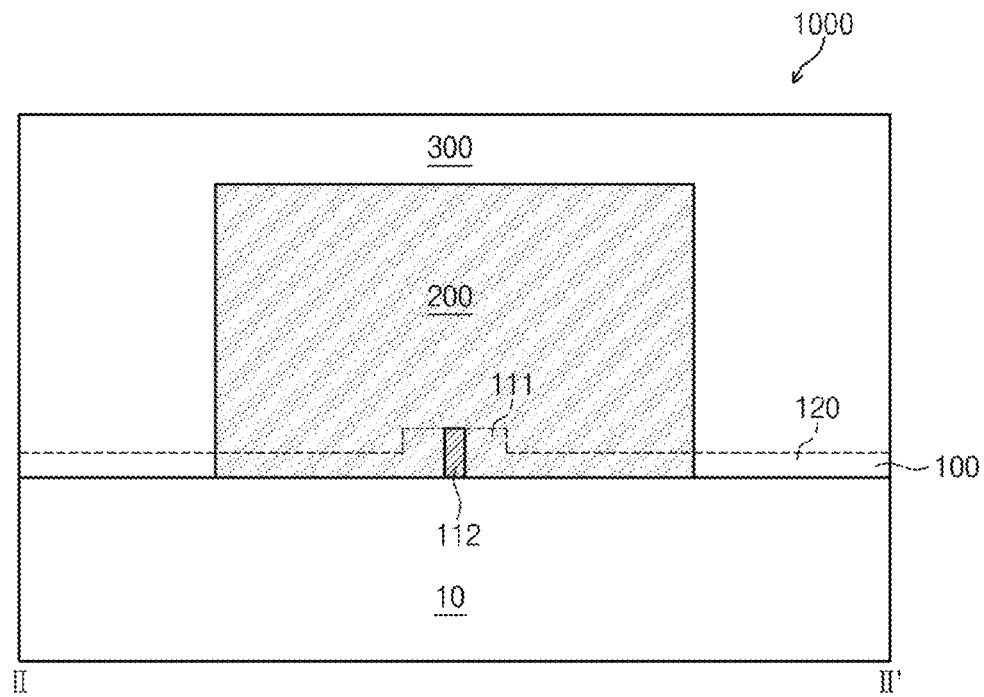

FIG. 1 is a plan view exemplarily illustrating an optical coupling device according to example embodiments of the inventive concept, and FIG. 2 is a perspective view exemplarily illustrating an optical coupling device according to example embodiments of the inventive concept. FIG. 3 is a sectional view taken along a dotted line I-I' of FIG. 1, and FIG. 4 is a sectional view taken along a dotted line II-II' of FIG. 1.

Referring to FIGS. 1 through 4, an optical coupling device 1000 according to the present embodiment may be provided to face a cutting plane 2010 of an optical fiber core 2000. The optical coupling device 1000 may include a first core layer 100 provided on a lower layer 10, a clad layer 300 provided on the first core layer 100, and a second core layer 200 interposed between the lower layer 10 and the clad layer 300 to cover a portion of the first core layer 100.

Each of the lower layer 10 and the clad layer 300 may be formed of a material having a refractive index smaller than those of the first and second core layers 100 and 200, and the first core layer 100 may be formed of a material having a refractive index greater than that the second core layer 200. In example embodiments, the lower layer 10 and the clad layer 300 may be formed of oxide (e.g., silicon oxide), the first core layer 100 may be formed of silicon, and the second core layer 200 may include at least one of materials, whose refractive indices are greater than those of the lower and clad layers 10 and 300 and are smaller than that of the first core layer 100. For example, the lower layer 10 and the first core layer 100 may be realized using a buried oxide layer and a silicon layer, respectively, constituting an SOI wafer.

The lower layer 10 may include a first region 11 adjacent to the optical fiber core 2000 and a second region 12 spaced apart from the optical fiber core 2000. The first core layer 100 may include a waveguide portion 110 crossing the first region 11 and extending into the second region 12 and a slab portion 120 disposed at both sides of the waveguide portion 110 to cover the first region 11 of the lower layer 10. The waveguide portion 110 and the slab portion 120 may be configured to form a ridge-type waveguide structure.

The waveguide portion 110 may include a first waveguide portion 111 positioned on the first region 11 and a second waveguide portion 112 positioned on the second region 12. The slab portion 120 may be thinner than the waveguide portion 110, and thus, the first core layer 100 may include a terraced region 130 around an interface between the first and second regions 11 and 12. In example embodiments, as shown in FIG. 2, the slab portion 120 may be removed from the second region 12, thereby exposing a top surface of the lower layer 10. However, example embodiments of the inventive concepts may not be limited thereto; for example, the first core layer 100 may further include a plate-shaped portion (not shown) provided on the second region 12 to have a thickness smaller than that of the slab portion 120.

A horizontal width of the first waveguide portion 111 may be substantially uniform, at least, on a portion of the first region 11. In addition, a vertical thickness of the first waveguide portion 111 may be substantially uniform, at least, on a portion of the first region 11. Accordingly, the first waveguide portion 111 may include a portion provided on the first region 11 and shaped like a rectangular parallelepiped.

A horizontal width of the second waveguide portion 112 may decrease with increasing distance from the first region 11. For example, the second waveguide portion 112 may be formed to have a tapered structure, and include a tip 115 spaced apart from the first region 11. A vertical thickness of the second waveguide portion 112 may be substantially the same as that of the first waveguide portion 111.

The second core layer 200 may be formed to cover the second waveguide portion 112 of the first core layer 100. For example, top and side surfaces of the second waveguide portion 112 may be covered with the second core layer 200. In example embodiments, the second core layer 200 may extend toward the first region 11 to cover a portion of the first waveguide portion 111 adjacent to the second waveguide portion 112.

As described above, the second core layer 200 may be formed of a material having a refractive index smaller than that of the first core layer 100, and thus, the second core layer 200 may serve as a cladding layer relative to the first core layer 100. In addition, the clad layer 300 may be formed of a material having a refractive index smaller than that of the second core layer 200, and thus, the clad layer 300 may serve as a clad layer relative to the second core layer 200.

The second core layer 200 may have an interface 210 disposed to face the cut plane 2010 of the optical fiber core 2000. As shown in FIG. 1, a horizontal width of the interface 210 may be substantially the same as that of the cut plane 2010. As shown in FIG. 3, a vertical thickness of the interface 210 may be substantially the same as that of the cut plane 2010. For example, the interface 210 of the second core layer 200 may be formed to have substantially the same area and shape as the cut plane 2010 of the optical fiber core 2000. Furthermore, the optical fiber core 2000 may be aligned in such a way that a central point of the interface 210 of the second core layer 200 is positioned on an extension of a central axis of the optical fiber core 2000.

According to the afore-described embodiments, a side surface (i.e., the interface 210 of the second core layer 200) of the optical coupling device 1000 may be used to realize an optical coupling between the optical coupling device 1000 and the optical fiber core 2000. According to one aspect of the inventive concept, a light incident through the first waveguide portion 111 having the ridge structure may have an increasing mode size, as it passes through the second waveguide portion 112 configured to have a tapered structure. In other words, a light may have a maximally increased mode size at a position of the tip 115, and thereafter, be incident to the optical fiber core 2000.

According to other aspect of the inventive concept, the first core layer 100 may have the terraced region 130 at the interface between the first and second waveguide portions 111 and 112. For example, as shown in FIG. 2, the slab portion 120 may be removed from the second region 12 to expose the top surface of the lower layer 10. Accordingly, a sidewall of the second waveguide portion 112 covered with the second core layer 200 may be greater in height than that of the first waveguide portion 111 covered with the clad layer 300. Due to the presence of the terraced region 130, an optical mode passing through the second waveguide portion 112 may be transformed to have a circular profile, as will be described with reference to FIGS. 5 through 9.

According to still other aspect of the inventive concept, the interface 210 of the second core layer 200 may have an area or size equivalent or similar to the optical fiber core 2000. As the result of the mode size matching, it is possible to reduce an optical loss in an optical coupling.

Even in the case where a light is transmitted from the optical fiber core 2000 to the optical coupling device 1000, it is possible to reduce the optical loss. For example, since the optical fiber core 2000 and the second core layer 200 are configured to realize the mode size matching, a light (e.g., single mode) incident from the optical fiber core 2000 may be transmitted to the first waveguide portion 111 via the second core layer 200 and the tip 115 of the second waveguide portion 112, with a reduced optical loss.

FIGS. 5 through 8 are diagrams showing a result of finite-difference time-domain (FDTD) analysis performed on the optical coupling device shown in FIGS. 1 through 4, and FIG. 9 is a diagram showing a result of FDTD analysis performed on an optical coupling device according to a comparative embodiment.

Figure 5:
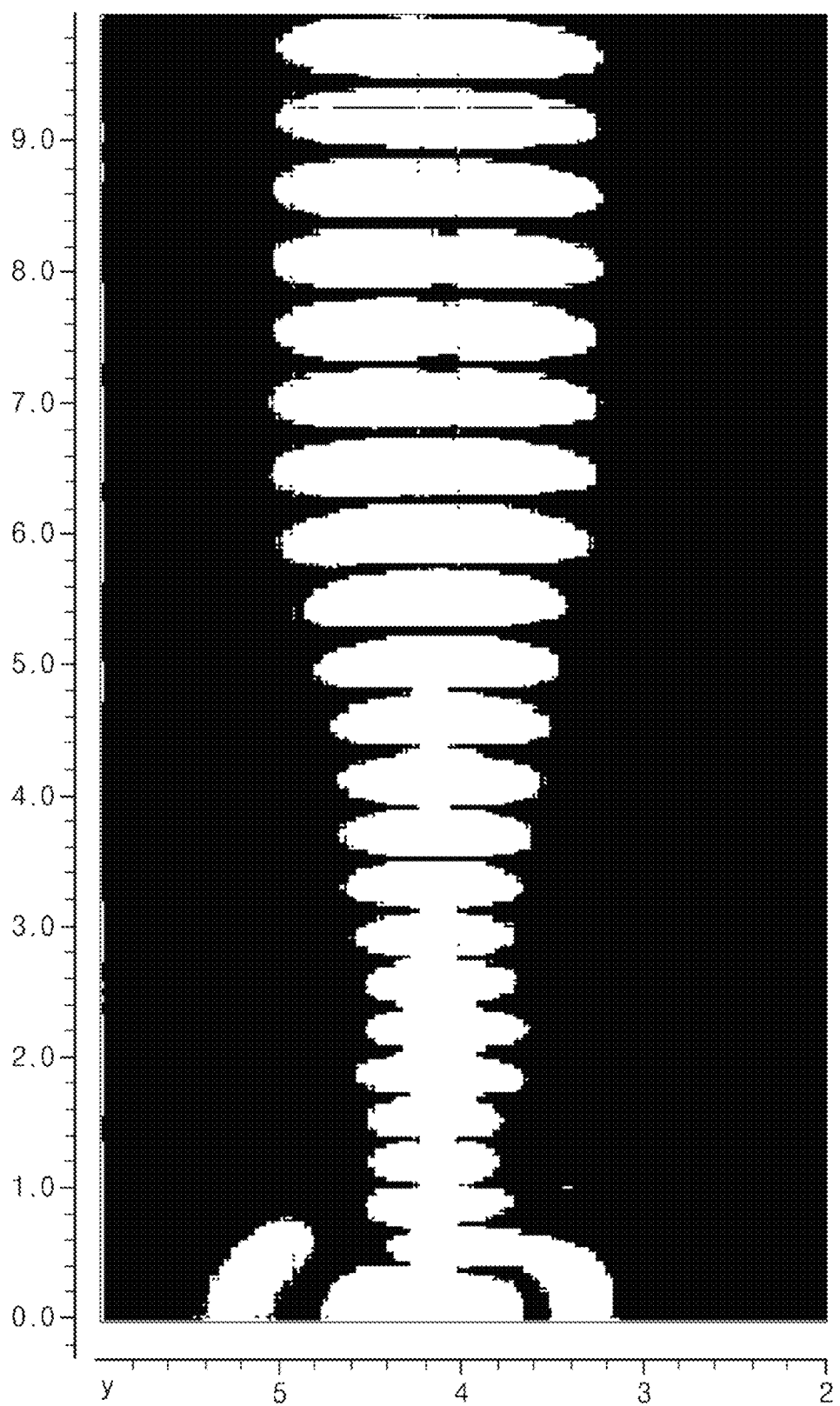
Figure 6:
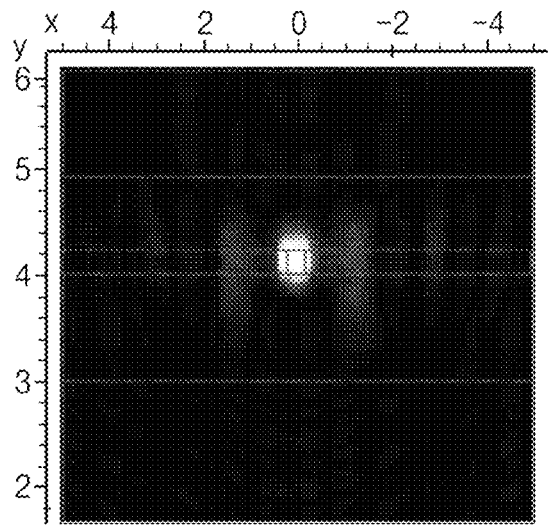
Figure 7:
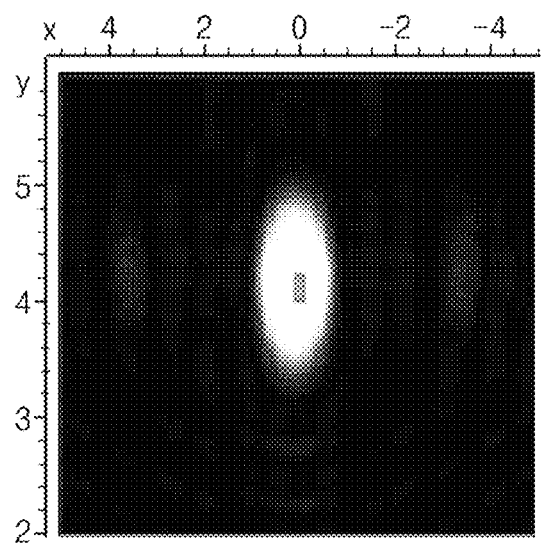

In detail, FIG. 5 shows a FDTD result of an optical coupling device according to the inventive concept measured along a dotted line I-I' of FIG. 1, and FIGS. 6 through 9 show FDTD results of an optical coupling device according to the inventive concept measured along planes parallel to a dotted line II-II' of FIG. 1. Here, the optical coupling device used to obtain the result shown in FIG. 9 was configured to have the same structure as the optical coupling device of FIG. 1, except for absence of the terraced region 130. In addition, FDTD results of FIGS. 8 and 9 were obtained from sectional planes crossing the tip 115.

Figure 8:
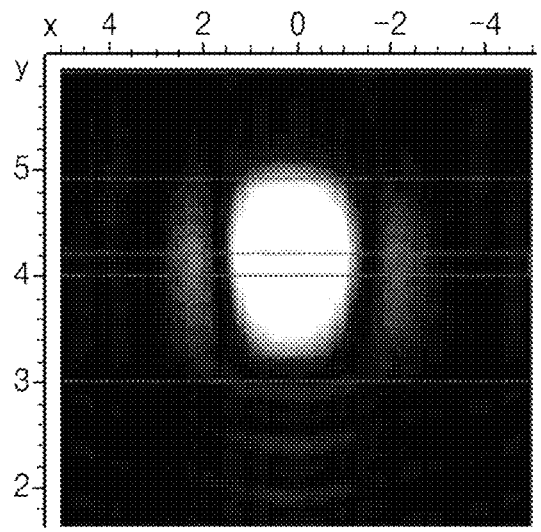

As shown in FIG. 5, a mode size was increased with increasing distance from the first waveguide portion 111 and was maximized near a position of the interface 210. The increase in mode size can be found from FDTD results of FIGS. 6 through 8. For example, as shown in FIG. 8, the mode size was about 3 mm×3 mm at a position of the tip 115. Furthermore, as shown in FIG. 8, for an optical coupling device with the terraced region 130, a mode shape was close to a circle at the position of the tip 115.

Figure 9:
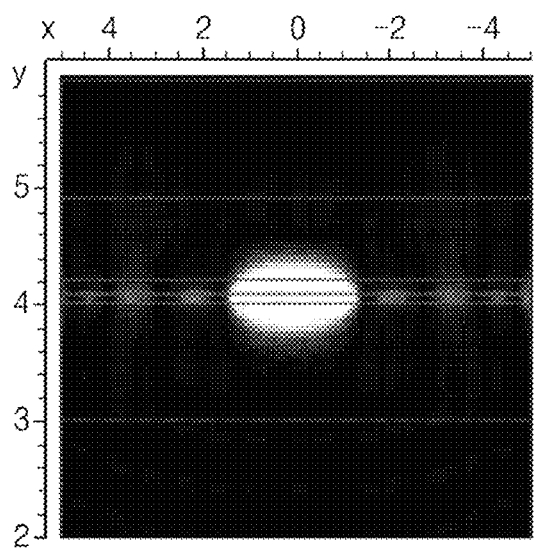

By contrast, as shown in FIG. 9, for an optical coupling device without the terraced region 130, a mode shape was close to an ellipse at the position of the tip 115, and a mode size was about 0.8 mm×3.5 mm. This may lead to a mismatching and an optical loss in an optical coupling with a single mode optical fiber.

Figure 10:
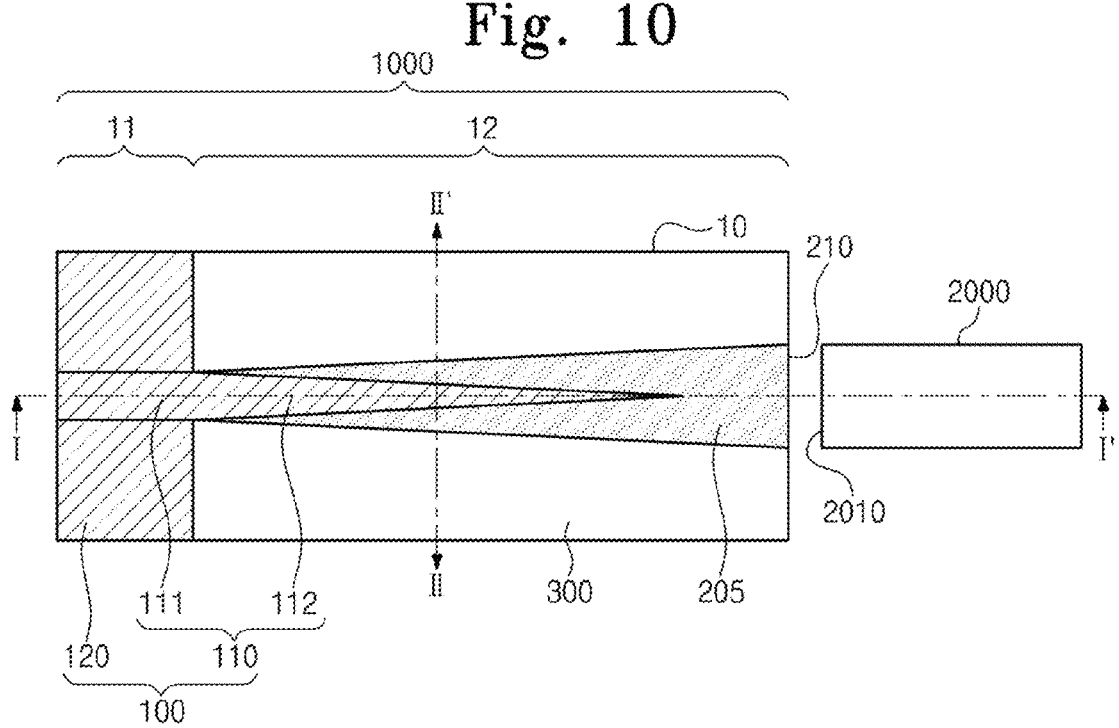
Figure 11:
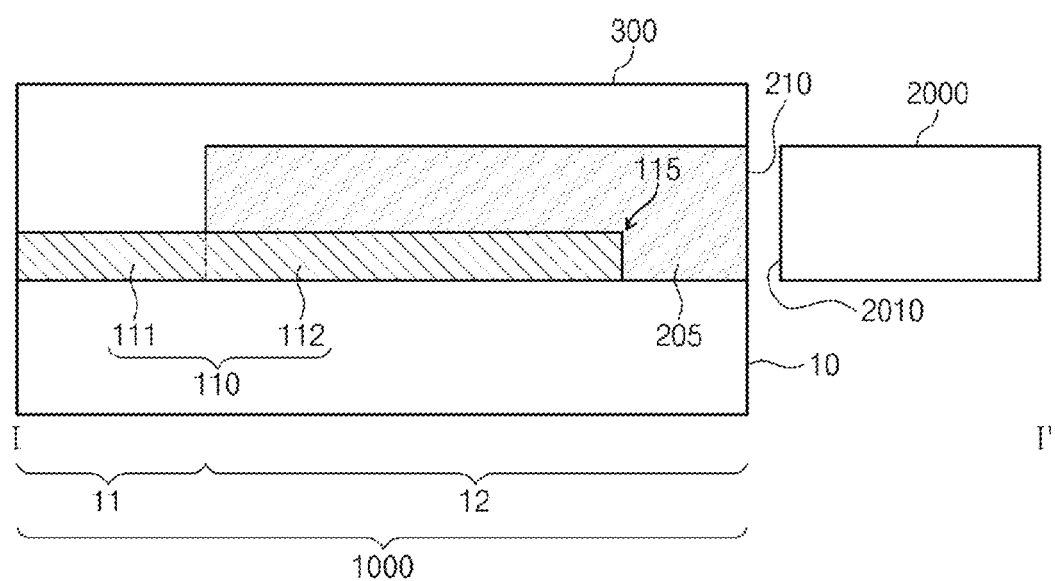
Figure 12:
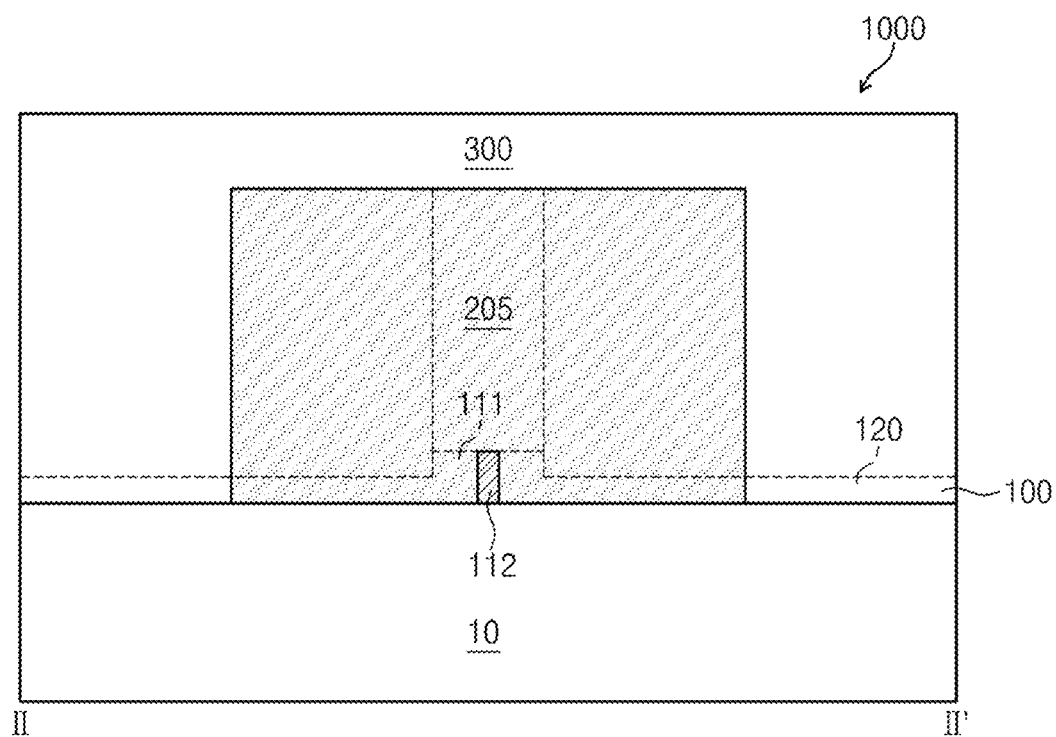

FIG. 10 is a plan view exemplarily illustrating an optical coupling device according to other example embodiments of the inventive concept, FIG. 11 is a sectional view taken along a dotted line I-I' of FIG. 10, and FIG. 12 is a sectional view taken along a dotted line II-II' of FIG. 10. For the sake of brevity, the elements and features of the present embodiments that are similar to those previously shown and described will not be described in much further detail.

Referring to FIGS. 10 through 12, an optical coupling device 1000 according to the present embodiment may be provided to face the cut plane 2010 of the optical fiber core 2000, and include the first core layer 100 provided on the lower layer 10, the clad layer 300 provided on the first core layer 100, and a second core layer 205 interposed between the lower layer 10 and the clad layer 300 to cover a portion of the first core layer 100. The lower layer 10, the first core layer 100, and the clad layer 300 according to the present embodiment may be configured to have the same technical features as those of the previous embodiment described with reference to FIGS. 1 through 4.

The second core layer 205 may be formed to cover the second waveguide portion 112 of the first core layer 100. For example, top and side surfaces of the second waveguide portion 112 may be covered with the second core layer 205. In example embodiments, the second core layer 205 may extend toward the first region 11 to cover a portion of the first waveguide portion 111 adjacent to the second waveguide portion 112.

The second core layer 205 may be formed of a material having a refractive index smaller than that of the first core layer 100, and thus, the second core layer 205 may serve as a cladding layer relative to the first core layer 100. In addition, the clad layer 300 may be formed of a material having a refractive index smaller than that of the second core layer 205, and thus, the clad layer 300 may serve as a clad layer relative to the second core layer 205.

The second core layer 205 may have an interface 210 disposed to face the cut plane 2010 of the optical fiber core 2000. As shown in FIG. 10, a horizontal width of the interface 210 may be substantially the same as that of the cut plane 2010. As shown in FIG. 11, a vertical thickness of the interface 210 may be substantially the same as that of the cut plane 2010. For example, the interface 210 of the second core layer 205 may be formed to have substantially the same area and shape as the cut plane 2010 of the optical fiber core 2000. Furthermore, the optical fiber core 2000 may be aligned in such a way that a central point of the interface 210 of the second core layer 205 is positioned on an extension of a central axis of the optical fiber core 2000.

According to the present embodiment, a horizontal width of the second core layer 205 may decrease with increasing distance from the optical fiber core 2000. For example, the second core layer 205 may be formed to have a tapered structure and, for example, the second core layer 205 may have a minimized horizontal width near an interface between the first and second waveguide portions 111 and 112.

According to the present embodiment, a side surface of the optical coupling device 1000 (i.e., the interface 210 of the second core layer 205) may be used to realize an optical coupling between the optical coupling device 1000 and the optical fiber core 2000. According to one aspect of the inventive concept, a light incident through the first waveguide portion 111 having the ridge structure may have an increasing mode size, as it passes through the second waveguide portion 112 configured to have a tapered structure. In other words, a light may have a maximally increased mode size at a position of the tip 115, and thereafter, be incident to the optical fiber core 2000.

According to other aspect of the inventive concept, the first core layer 100 may have the terraced region 130 at the interface between the first and second waveguide portions 111 and 112. For example, as shown in FIG. 2, the slab portion 120 may be removed from the second region 12 to expose the top surface of the lower layer 10. Accordingly, a sidewall of the second waveguide portion 112 covered with the second core layer 205 may be greater in height than that of the first waveguide portion 111 covered with the clad layer 300. In the case where the terraced region 130 is formed, an optical mode passing through the second waveguide portion 112 may be transformed to have a circular profile, as previously described with reference to FIGS. 5 through 9.

According to still other aspect of the inventive concept, the interface 210 of the second core layer 205 may have an area or size equivalent or similar to the optical fiber core 2000. As the result of the mode size matching, it is possible to reduce an optical loss in an optical coupling.

Even in the case where a light is transmitted from the optical fiber core 2000 to the optical coupling device 1000, it is possible to reduce the optical loss. For example, since the optical fiber core 2000 and the second core layer 205 are configured to realize the mode size matching, a light (e.g., single mode) incident from the optical fiber core 2000 may be transmitted to the first waveguide portion 111 via the second core layer 205 and the tip 115 of the second waveguide portion 112, with a reduced optical loss. In addition, due to the tapered structure of the second core layer 205, the optical transmission can be effectively realized in both directions.

Figure 13:
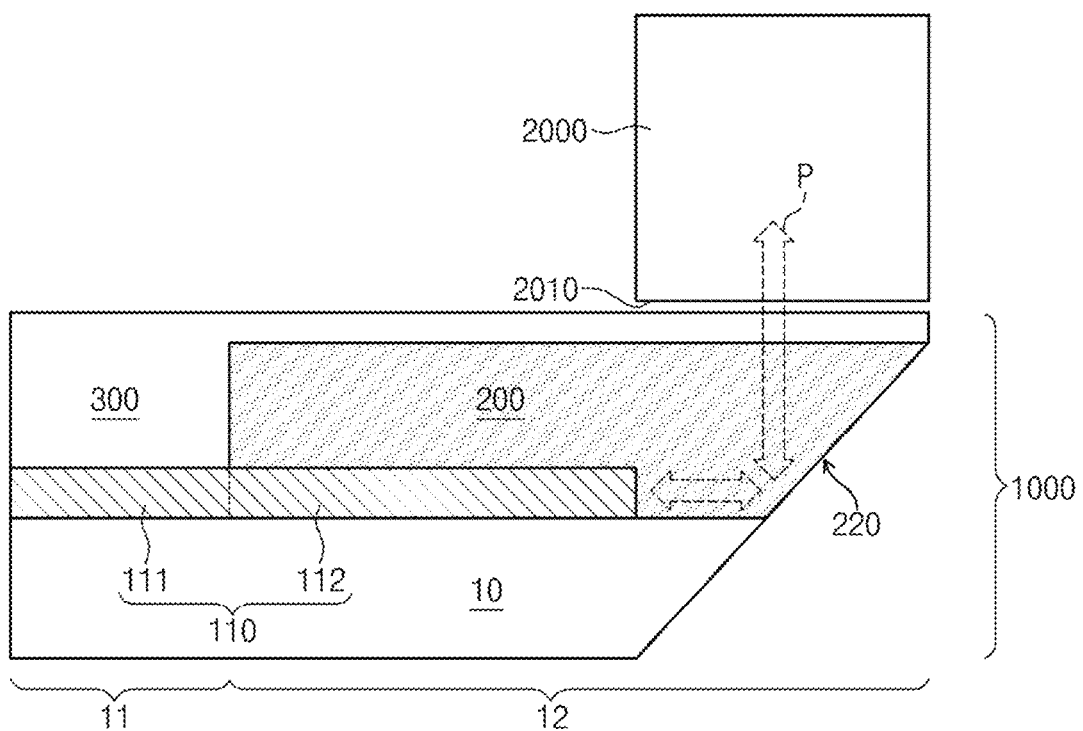
Figure 14:
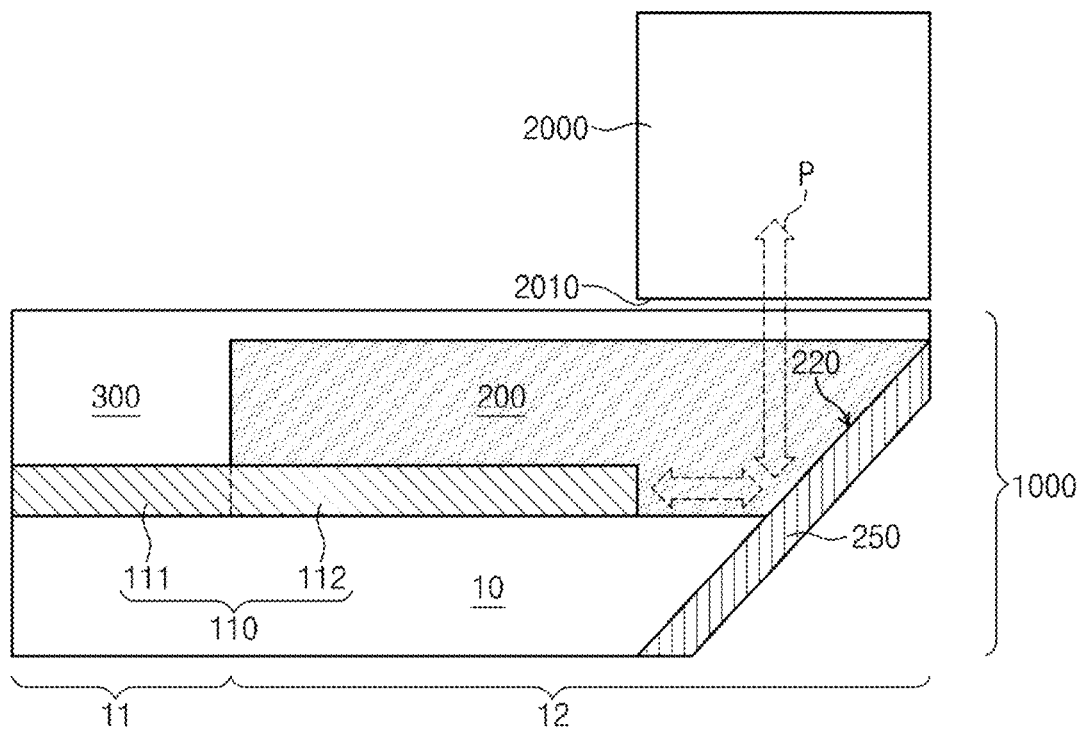
Figure 15:
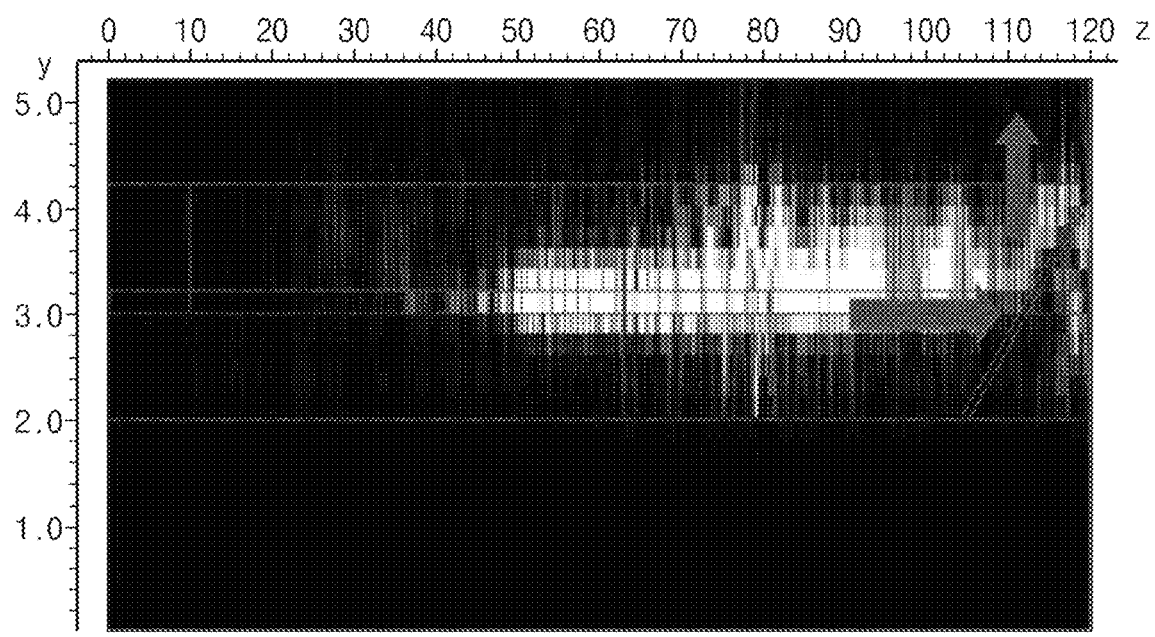
Figure 16:
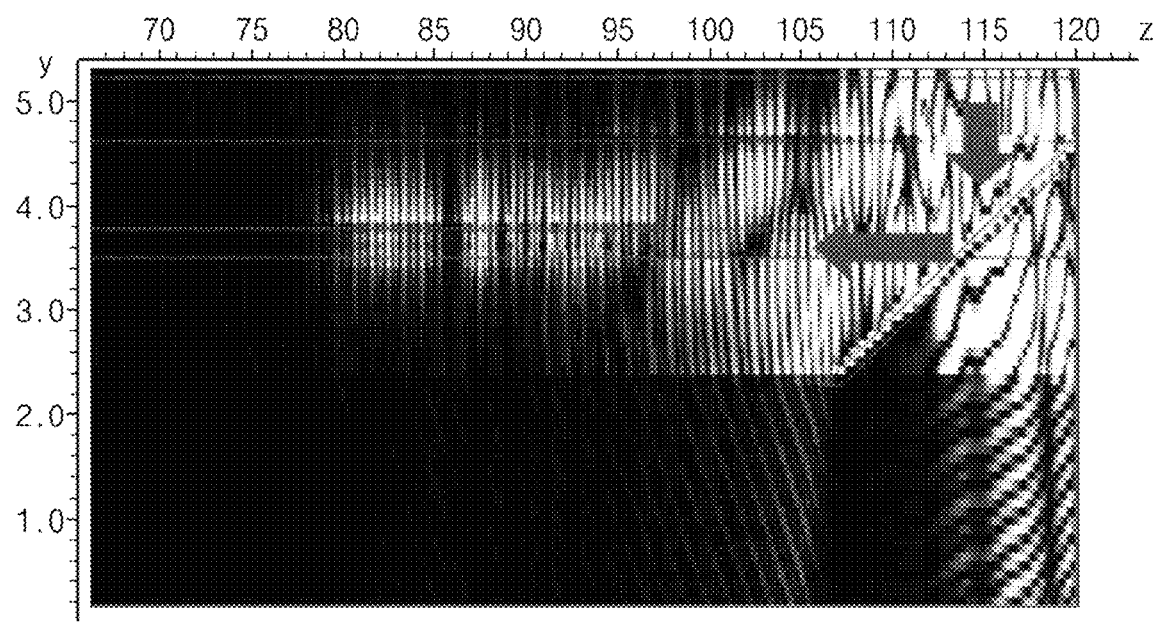

FIGS. 13 and 14 are sectional views exemplarily illustrating optical coupling devices according to still other example embodiments of the inventive concept, and FIGS. 15 and 16 are diagrams showing a result of FDTD analysis performed on the optical coupling device of FIG. 13 or FIG. 14. For the sake of brevity, the elements and features of the present embodiments that are similar to those previously shown and described will not be described in much further detail.

Referring to FIGS. 13 and 14, the optical coupling devices 1000 may include a top surface facing the cut plane 2010 of the optical fiber core 2000. For example, the optical fiber core 2000 may be provided on the optical coupling device 1000, and the cut plane 2010 may be substantially parallel to a top surface of the lower layer 10 or the clad layer 300.

The second core layer 200 of the optical coupling device 1000 may have a reflecting surface 220 formed to be inclined to the top surface of the lower layer 10 or the clad layer 300. Due to the presence of the reflecting surface 220, it is possible to change a propagation direction of a light, which may be transmitted from or to the second waveguide portion 112, (e.g., from a horizontal direction to a vertical direction). The FDTD results of FIGS. 15 and 16 show that it is possible to change bi-directionally the light propagating direction with effect. In this sense, the reflecting surface 220 in the present embodiments is differentiated from the interface 210, which may be configured to allow transmission of a light, in the previous embodiments.

The reflecting surface 220 may be formed by one of various methods. For example, the formation of the reflecting surface 220 may include a step of using at least one of sawing or polishing methods. Alternatively, the formation of the reflecting surface 220 may include forming a sacrificial pattern on the lower layer 10 to have an inclined surface, forming the second core layer 200 using the sacrificial pattern as a mold, and then, selectively removing the sacrificial pattern. In example embodiments, the sacrificial pattern may be a pattern epitaxially grown from the first core layer 100 or a portion thereof.

In example embodiments, the optical fiber core 2000 may be provided non-parallel to both of the top surface of the lower or clad layer 10 or 300 and its normal line. For example, the optical fiber core 2000 may be slantingly disposed with respect to the optical coupling device 1000. The slanting angle of the reflecting surface 220 may be adjusted to be compatible with the slant disposition of the optical fiber core 2000.

Furthermore, as exemplarily shown in FIG. 14, a reflecting element 250 may be further provided on the reflecting surface 220. The reflecting element 250 may be formed of a material (e.g., a metal) having a high reflectance and be formed to cover the reflecting surface 220.

Figure 17:
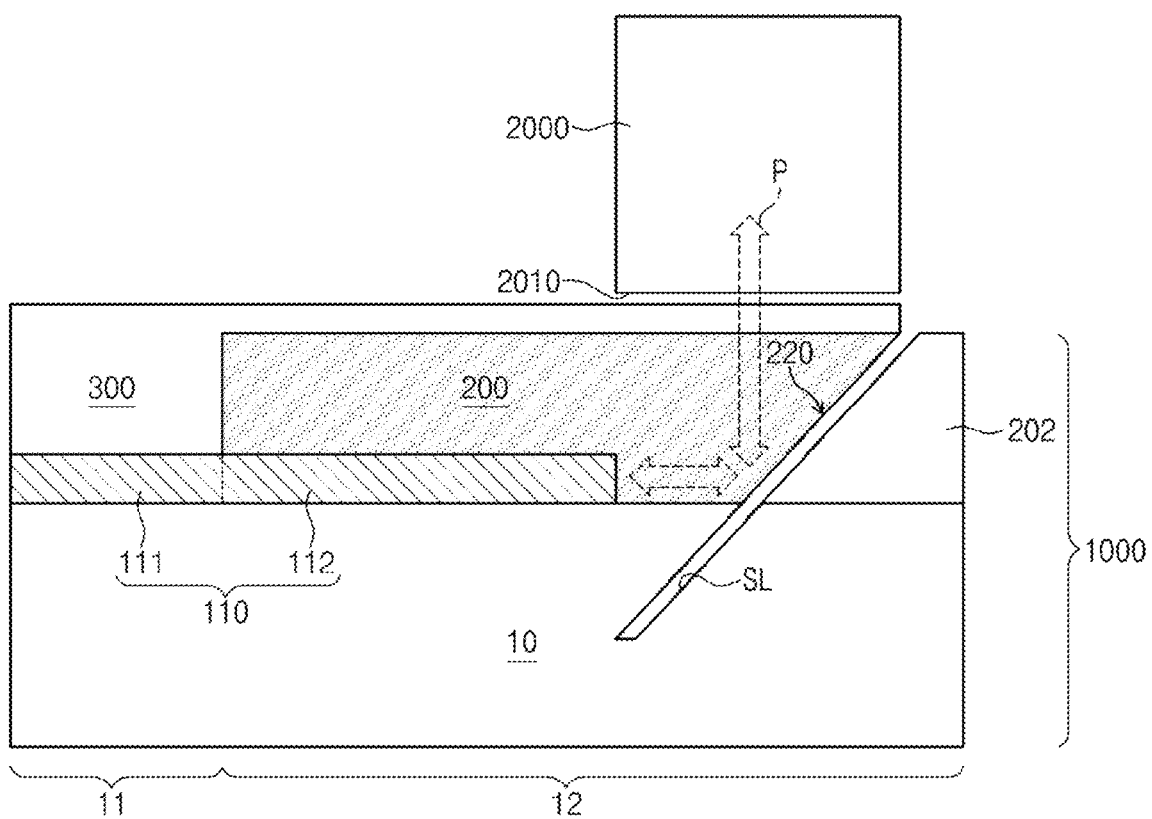
Figure 18:
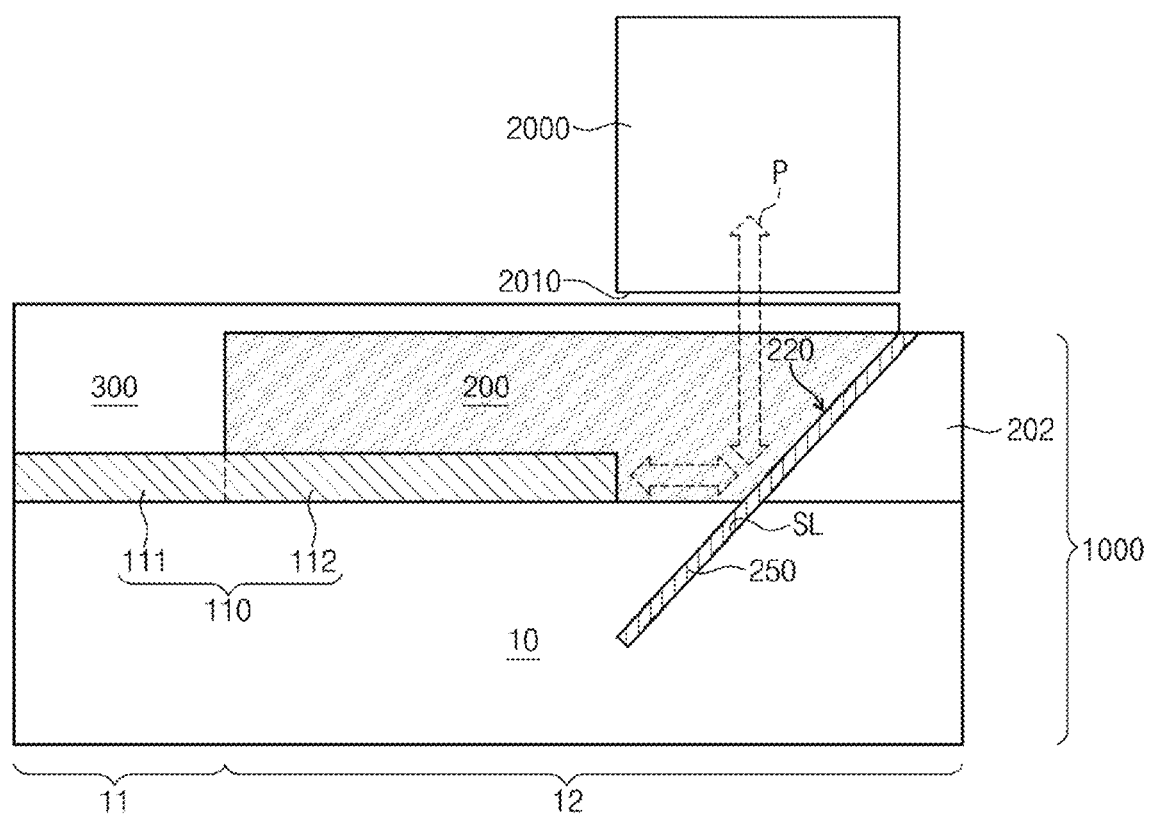

FIGS. 17 and 18 are sectional views exemplarily illustrating optical coupling devices according to even other example embodiments of the inventive concept. Except for a difference to be described below, optical coupling devices according to the present embodiments may be configured to have the same technical features as those of the previous embodiments described with reference to FIGS. 13 and 14, and thus, for the sake of brevity, the elements and features of the present embodiment that are similar to those previously shown and described will not be described in much further detail.

Referring to FIGS. 17 and 18, the second core layer 200 may be formed to have a slit SL defining the reflecting surface 220. For example, the slit SL may be formed to be inclined to the top surface of the lower or clad layer 10 or 300, and one surface of the slit SL may serve as the reflecting surface 220. In example embodiments, the slit SL may be formed by sawing the second core layer 200.

In example embodiments, due to the presence of the presence of the slit SL, the second core layer 200 may be divided into a first portion serving as an optical pathway and a second portion 202 spaced apart from the first portion. In addition, the first portion and the second portion 202 of the second core layer 200 may be attached to the lower layer 100 provided thereunder, and thus, a relative disposition therebetween may be fixed.

According to example embodiments of the inventive concept, the optical coupling device may include a tapered waveguide extending from a ridge-type waveguide. The tapered waveguide may be formed to have a sidewall thickness greater than that of the ridge-type waveguide, and be covered with a second core layer, whose sectional area is equivalent to that of an optical fiber core. As a result, a mode size and a mode shape in the reversely-tapered waveguide can become similar to those in the optical fiber core, and this enables to reduce an optical loss caused by a mode mismatching.

Furthermore, in example embodiments, the second core layer may be configured to have an inclined reflecting surface, and this enables to realize a vertical coupling.

While example embodiments of the inventive concepts have been particularly shown and described, it will be understood by one of ordinary skill in the art that variations in form and detail may be made therein without departing from the spirit and scope of the attached claims.

What is claimed is:

1. An optical coupling device, comprising:
   a lower layer having a first region and a second region;
   a first core layer disposed on a top surface of the lower layer, the first core layer including first and second waveguides disposed on the first and second regions, respectively, and a slab portion provided at both sides of the first waveguide to cover the first region;
   a clad layer covering the first waveguide; and
   a second core layer interposed between the clad layer and the lower layer to cover the second waveguide,
   wherein the second waveguide has a width decreasing with increasing distance from the first region and a sidewall of the second waveguide has a height greater than a height of a sidewall of the first waveguide.

2. The device of claim 1, wherein a vertical thickness of the slab portion is smaller than a vertical thickness of the first waveguide, the vertical thicknesses being measured along a direction substantially perpendicular to the top surface of the lower layer.

3. The device of claim 1, wherein the slab portion is formed to expose the second region of the lower layer.

4. The device of claim 1, wherein the second waveguide is formed to have a tapered structure, thereby including a tip spaced apart from the first waveguide, and
the tip of the second waveguide is covered with the second core layer.

5. The device of claim 1, wherein the second core layer comprises an outer surface configured to face an external optical fiber provided at the outside thereof, and
the outer surface of the second core layer has an area corresponding to that of a core of the external optical fiber.

6. The device of claim 5, wherein a horizontal width of the second core layer is substantially uniform, when measured along a direction of a longitudinal axis of the second waveguide direction.

7. The device of claim 5, wherein a horizontal width of the second core layer decreases with decreasing distance from the first waveguide, when measured along a direction of a longitudinal axis of the second waveguide direction.

8. The device of claim 5, wherein the second waveguide comprises a tip spaced apart from the outer surface of the second core layer and the first waveguide.

9. The device of claim 1, wherein the first core layer is formed of a first material having a first refractive index,
the second core layer is formed of a second material having a second refractive index smaller than the first refractive index,
the clad layer is formed of a third material having a refractive index smaller than the second refractive index, and
the lower layer is formed of a fourth material having a refractive index smaller than the second refractive index.

10. The device of claim 9, wherein the first material includes silicon, the third material includes silicon dioxide, and the fourth material includes silicon dioxide.

11. An optical coupling device, comprising:
a first core layer including first and second waveguides;
a clad layer covering the first waveguide; and
a second core layer covering the second waveguide,
wherein the second waveguide has a width decreasing with increasing distance from the first waveguide and a sidewall of the second waveguide has a height greater than a height of a sidewall of the first waveguide, and
the second core layer comprises a reflecting surface slantingly provided on a longitudinal axis of the second waveguide and at a distance from the second waveguide.

12. The device of claim 11, wherein the reflecting surface of the second core layer has a slanting angle selected to change a propagation direction of an incident light from a direction parallel to the second waveguide to a direction substantially perpendicular to a top surface of the clad layer.

13. The device of claim 11, further comprising a reflecting element formed of a material having a high reflectance to cover the reflecting surface.

14. The device of claim 11, wherein the second core layer is formed to define a slit, the slit is formed to be inclined to a top surface of the second core layer, and one surface of the slit serves as the reflecting surface.

15. The device of claim 14, further comprising, a lower layer provided below the first and second core layers,
wherein the second core layer comprises first and second portions attached to the lower layer at both sides of the slit, respectively, and a relative disposition between the first and second portions is fixed by the lower layer.

16. A silicon photonics chip, comprising:
at least one optical device;
a first waveguide connected to the optical device;
a second waveguide extending from the first waveguide;
a slab waveguide covering partially both sidewalls of the first waveguide;
a clad layer provided on the first and second waveguides; and
a third waveguide interposed between the clad layer and the second waveguide to cover the second waveguide,
the clad layer is formed of a material having a refractive index smaller than that of the first and second waveguides, and the third waveguide is formed of a material having a refractive index smaller than that of the second waveguide and greater than that of the clad layer,
the second waveguide has a width decreasing with increasing distance from the first waveguide and a vertical thickness greater than that of the first waveguide.

17. The silicon photonics chip of claim 16,
wherein a difference in height between top surfaces of the first and slab waveguides is smaller than the vertical thickness of the second waveguide.

18. The silicon photonics chip of claim 16, wherein the third waveguide comprises a reflecting surface provided on a longitudinal axis of the second waveguide, and the reflecting surface is formed to be inclined to the longitudinal axis of the second waveguide.

19. The silicon photonics chip of claim 18, further comprising a reflecting element formed of a material having high reflectance to cover the reflecting surface.

* * * * *